Oct. 31, 1950        T. E. RULE        2,527,766
PROCESS OF MAKING FLY ASH CONTAINING BUILDING BLOCKS
Filed Aug. 1, 1947
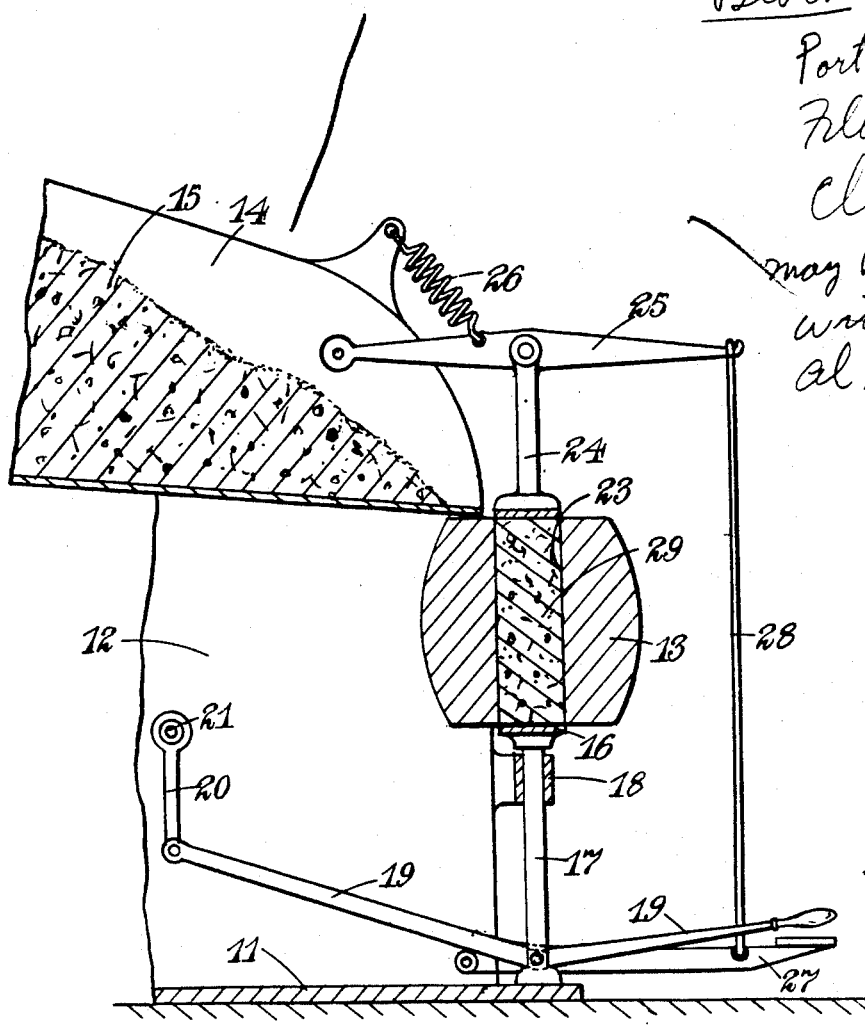
Block
Portland Cement
Fly ash
Clay
may be reinforced
with paint or
al stearate
INVENTOR
Tom E. Rule
By Watson, Cole, Grindle & Watson Patented Oct. 31, 1950

2,527,766

UNITED STATES PATENT OFFICE 2,527,766

PROCESS OF MAKING FLY ASH CONTAINING BUILDING BLOCKS

Tom Edgar Rule, Stockton-on-Tees, England, assignor of one-half to Frederick Gilbert Mitchell, London, England Application August 1, 1947, Serial No. 765,299
In Great Britain July 17, 1944

Section 1, Public Law 690, August 8, 1946
Patent expires July 17, 1964

2 Claims. (Cl. 106—97)

This invention comprises improvements in or relating to the utilisation of furnace ash. The invention has for its object to deal with "fly ash" which is the fine ash resulting from burning pulverised coal. Pulverised fuel furnaces are usually employed in large installations and such ash is ordinarily thrown down out of the flue gases in a Lodge Cotterell electrostatic precipitating plant because it is so fine that it would otherwise be carried away and distributed in the atmosphere to the detriment of the neighbourhood on account of the great quantities produced. When precipitated the material is damped with a water spray and carried to a dump. Various attempts to find a use for it, including mixing wet with cement and sand in proportions of 40% or thereabouts to make building blocks, have not proved successful. It is to be understood that the term "fly-ash" as used herein is restricted to this exceedingly fine precipitated ash from pulverised fuel plants and does not include coarser ashes such as cinders obtained by ordinary burning of coal in furnaces. Ordinary cinders have no setting value but merely act as an inert material when mixed with cement, being in this respect analogous to sand.

The main constituents of "fly ash" are alumina and silica, the alumina being associated with ferric oxide. The material is essentially a fine clay. When mixed with water it has a certain setting value like a cement. On drying it is liable to disintegrate into a fine powder, but hardens again if wetted and kept in a slightly damp situation, such as under the soil.

Attempts have been made to convert the "fly ash" into useful products by several methods, for instance by using a mixture of the "fly ash" with magnesium oxide and hydrated lime, or with calcium chloride and hydrated lime, or again with magnesium chloride and magnesium oxide; also sodium silicate has been used as a binder and by the application of heat a light aerated material has been made. The above mixtures have various objections when used for preparing building materials among which is the possibility of reaction between the added chemicals on the one hand and paint or renderings such as the various plasters used in modern building practice on the other.

Also the percentage value of dry shrinkage of the finished products may be uncertain in adverse conditions. The shrinkage value of any building material has an important bearing on its use, as materials which shrink unduly do not contribute to keeping buildings water-tight or to the maintenance of stability.

We have found that if building materials are produced from "fly ash" by the use of small percentages of portland cement these disadvantages are obviated. This mixture produces building materials which have a lower dry shrinkage value than concrete products and has no serious adverse effect on renderings or paints.

According to the present invention, therefore, the material in a dry condition (that is to say not containing more than a few percent of water sufficent to reduce dusting losses when mixing but insufficient to make it cohere), is mixed with a small percentage of portland cement, is damped only sufficiently to enable it to cohere when pressed and then pressed into blocks which can be utilised for building and other purposes. The total percentage of water required may be of the order of 20% to 30% and is not sufficient to produce a slurry or wet mixture like concrete. The proportion of cement may vary from 5% to 20% and is often preferably about 15%.

Such a mixture by itself when set is fairly stable but is liable to have a dusty surface when dry. By mixing with a small proportion, say 0.5% to 1½% of plastic clay before moulding it becomes more cohesive and has a fine smooth surface free from dustiness. The clay may be introduced in suspension in the damping water.

The following is an example of the manufacture of building blocks in accordance with the invention, reference being made to the accompanying drawing which is a diagrammatic representation in vertical section of the apparatus employed.

In the drawing there is a base 11 supporting vertical cheeks 12, of which there are two, parallel to each other and carrying between them a metal mould 13 having a narrow deep vertical rectangular smooth-sided cavity 23 of the shape and size of the desired blocks of moulded material. Above the mould 13 is a shute 14 for delivery of a mixture 15 of material to be moulded. The bottom of the mould is closed by a false bottom 16 of the shape and size in plan of the cavity 23, which plate rests on a pillar 17 slidable vertically in a bracket 18. The false bottom 16 is not fixed to the pillar 17 but can be lifted away. At its lower end the pillar 17 is pivotally connected to a lever 19, supported at one end by a link 20 hung on a fixed cross bar 21 between the cheeks 12, and extending forwardly therefrom to a handle 22. By the handle 22, the lever 19 and with it the pillar 17 and false bottom 16, can be raised when desired, to eject moulded bodies 29 from the cavity 23 of the mould 13. A rammer 24 is disposed above the mould, being hung from a lever 25. The lever 25 is raised by a spring 26 and the rammer can be forced downwardly as often as desired, to compress the mouldings 29 in the cavity 23, by means of a treadle 27 linked to the lever 25 by a rod 28.

It will be noted that the molded bodies 29 in the cavity 13 are compressed edgewise, which is found to be best if the blocks are to be used upright in building, as it reduces risk of flaking or spalling of the exposed surface.

Example

Fly ash was taken which was obtained from the Leicester Corporation power plant at Leicester, England. One hundred and ninety pounds of the fly ash was mixed in an ordinary concrete mixer with 34 lbs. of portland cement. About 30 lbs. of water were sprayed into the mixer and the mixture (taking account of the moisture already present in the fly ash) contained about 20 percent of water. The water used was mixed with fine puddled clay so as to contain about 5% of suspended clay. After mixing, the material was in a damp state, like garden soil after rain, but was not wet like a slurry or freshly mixed concrete. The fine material was filled, charged into the chute 14 and thence fed into the mold 13 above the wooden false bottom 16. The dimensions of the mold were eighteen inches long by two inches wide internally and fourteen inches deep. Molds up to 4 inches wide have been employed. The loose material was compressed until it was reduced in depth by bringing down upon it the heavy metallic top mould-member or ram 24 pressed home by the foot-treadle 27. This ramming action, which did not exert a heavy force such as would be obtained in a power press, was repeated several times and the effect was sufficient to consolidate the blocks. The moulding was thus reduced in height to nine inches. The ram 24 being then lifted, the block was ejected by lifting up the false bottom 16 from below by lever 19 and was allowed to dry for 28 days in a drying shed at atmospheric temperature while still supported on the wooden false-bottom 16.

Dried blocks thus produced had a fine smooth surface and a compression strength of 1960 lbs. per square inch. The shrinkage during drying did not exceed 0.03%–0.05%.

The small shrinkage and substantial strength of blocks produced according to this invention makes them suitable for production to exact sizes in the form of partition slabs, building blocks, bricks or other products for use in the building trade. The strength nearly approaches that of concrete made from ballast and sand. The fine smooth surface finish, which is peculiar to the material, is such that paint may be applied direct and a single coat will provide a finish without priming. Colouring pigments may be introduced into the mixture itself before moulding if desired.

Building blocks made with this mixture may be water-proofed by any of the usual waterproofing agents used in preparing ordinary concrete products. Aluminium stearate, soft soap, followed by a wash with alum, or oleic acid may be used for this purpose, or the surfaces of the blocks may be washed over with succeeding coats of sodium silicate.

I claim:

1. A process of manufacture of blocks for building and like purposes consisting in taking fly-ash in a dry condition, that is, not containing more than a few per cent of water sufficient to reduce dusting losses when mixing but insufficient to make it cohere, mixing it with Portland cement and finely puddled clay and damping with water, the quantity of Portland cement being between 5% and 20%, of clay 0.5% to 1.5% and the quantity of water being between about 20% and 30% of the total weight of the mixture, so as to produce a damp powder, pressing into blocks and ageing the blocks to harden them.

2. A process as claimed in claim 1, wherein the clay is introduced in suspension in the damping water.

TOM EDGAR RULE.

REFERENCES CITED

The following references are of record in the file of this patent:

UNITED STATES PATENTS

| Number | Name | Date |
|---|---|---|
| 1,710,921 | Cross | Apr. 30, 1929 |
| 1,886,933 | Askenasy | Nov. 8, 1932 |
| 2,250,107 | Nelles | July 22, 1941 |

FOREIGN PATENTS

| Number | Country | Date |
|---|---|---|
| 107,868 | Great Britain | 1917 |